United States Patent
Cao et al.

(10) Patent No.: US 12,314,426 B2
(45) Date of Patent: May 27, 2025

(54) TRANSMISSION OF SENSITIVE DATA IN A COMMUNICATION NETWORK

(71) Applicant: Bank of America Corporation, Charlotte, NC (US)

(72) Inventors: Min Cao, Shanghai (CN); Ryan William Nielsen, Singapore (SG); Eric Ryan Camarata, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 472 days.

(21) Appl. No.: 17/551,846

(22) Filed: Dec. 15, 2021

(65) Prior Publication Data

US 2023/0185954 A1 Jun. 15, 2023

(51) Int. Cl.
*G06F 21/62* (2013.01)
*G06F 21/60* (2013.01)

(52) U.S. Cl.
CPC ........ *G06F 21/6245* (2013.01); *G06F 21/604* (2013.01)

(58) Field of Classification Search
CPC ........................... G06F 21/6245; G06F 21/604
USPC ......................................................... 726/30
See application file for complete search history.

(56) References Cited

U.S. PATENT DOCUMENTS

| | | | | |
|---|---|---|---|---|
| 5,408,665 A | * | 4/1995 | Fitzgerald | G06F 8/433 707/999.01 |
| 6,266,784 B1 | * | 7/2001 | Hsiao | G06F 11/1469 714/E11.122 |
| 6,865,726 B1 | * | 3/2005 | Igusa | G06F 30/392 716/124 |

(Continued)

FOREIGN PATENT DOCUMENTS

| | | | | |
|---|---|---|---|---|
| CN | 104408676 A | * | 3/2015 | G06Q 50/22 |
| CN | 109474687 B | * | 8/2020 | H04L 61/20 |

(Continued)

OTHER PUBLICATIONS

Chandran, Ashwathi, and C. K. Shyamala. "Data management issues in cloud integrated computing: A big picture." In 2017 4th International Conference on Advanced Computing and Communication Systems (ICACCS), pp. 1-8. IEEE, 2017. (Year: 2017).*

(Continued)

*Primary Examiner* — Luu T Pham
*Assistant Examiner* — Walter J Malinowski
(74) *Attorney, Agent, or Firm* — Banner & Witcoff, Ltd.

(57) ABSTRACT

A system for generation and distribution of data handling requirements associated with sensitive data among a plurality of computing networks is described. Specifically, data generated at a first computing network may be tagged with associated data handling requirements. A reference library entry may be generated to include an indicator of the data and the associated data handling requirements. The reference library entry may be distributed to the plurality of computing networks, wherein each of the plurality of computing networks may add the reference library entry to corresponding reference libraries. Updates to the reference library entry, made at any one of the plurality of computing networks, may be propagated to other computing networks such that an updated listing of data handling requirements is accessible to users associated with the plurality of computing networks.

18 Claims, 6 Drawing Sheets

(56) References Cited

U.S. PATENT DOCUMENTS

| | | | |
|---|---|---|---|
| 7,200,808 B1* | 4/2007 | Nagao | G06F 3/0481 707/999.01 |
| 7,958,147 B1* | 6/2011 | Turner | G06Q 10/10 707/694 |
| 8,891,546 B1* | 11/2014 | Frenkel | H04L 63/0254 370/282 |
| 9,740,757 B1 | 8/2017 | Gilder et al. | |
| 10,346,635 B2 | 7/2019 | Kumar et al. | |
| 10,594,740 B2 | 3/2020 | Barday et al. | |
| 10,642,870 B2 | 5/2020 | Malhotra et al. | |
| 10,719,625 B2 | 7/2020 | Van Dyne et al. | |
| 2003/0061370 A1* | 3/2003 | Nakayama | H04L 9/40 709/248 |
| 2003/0072423 A1* | 4/2003 | Momonami | H04M 15/56 379/93.02 |
| 2006/0262760 A1* | 11/2006 | Bae | H04N 7/17318 348/E7.071 |
| 2007/0013968 A1* | 1/2007 | Ebaugh | G06F 16/2228 707/E17.084 |
| 2008/0120398 A1* | 5/2008 | Hiroki | H04W 48/16 709/219 |
| 2008/0174829 A1* | 7/2008 | Nuaimi | H04N 1/2307 358/407 |
| 2008/0281944 A1* | 11/2008 | Vorne | H04L 67/12 709/218 |
| 2009/0034015 A1* | 2/2009 | Mulligan | H04N 1/00832 358/408 |
| 2009/0164531 A1* | 6/2009 | Tanaka | G06F 11/1662 |
| 2009/0245144 A1* | 10/2009 | Chida | H04M 3/42178 370/271 |
| 2010/0124924 A1* | 5/2010 | Cheng | H04W 64/00 455/434 |
| 2011/0004788 A1* | 1/2011 | Petit | G06F 16/2315 714/17 |
| 2011/0033050 A1* | 2/2011 | Maller | H04L 9/0825 705/14.58 |
| 2011/0035581 A1* | 2/2011 | Maller | H04L 51/214 709/206 |
| 2011/0199259 A1* | 8/2011 | Karaoguz | G01S 19/48 342/357.28 |
| 2012/0331002 A1 | 12/2012 | Carrington | |
| 2013/0139260 A1* | 5/2013 | McDougal | G06F 21/567 726/23 |
| 2014/0032914 A1* | 1/2014 | Foygel | G06F 21/64 713/176 |
| 2014/0049791 A1* | 2/2014 | Nakamura | H04L 67/02 358/1.13 |
| 2015/0370826 A1* | 12/2015 | Mraz | G06F 16/178 707/617 |
| 2016/0026892 A1* | 1/2016 | Hansson | H04N 1/32133 382/162 |
| 2016/0188625 A1* | 6/2016 | Chu | G06F 16/1794 707/622 |
| 2016/0248809 A1* | 8/2016 | Smith | H04L 63/20 |
| 2017/0344602 A1* | 11/2017 | Hada | G06F 16/22 |
| 2019/0056955 A1* | 2/2019 | Pennala | G06F 9/5077 |
| 2019/0180746 A1* | 6/2019 | Diwan | G06F 16/252 |
| 2019/0244012 A1* | 8/2019 | Thompson | G06V 40/171 |
| 2019/0347334 A1* | 11/2019 | Sundaramoorthy | G06F 21/6218 |
| 2020/0150620 A1* | 5/2020 | Gray | G05B 19/4183 |
| 2020/0382359 A1* | 12/2020 | Rao | H04L 41/0604 |
| 2021/0342361 A1* | 11/2021 | Radzewsky | G06F 16/23 |
| 2021/0349885 A1* | 11/2021 | Wald | G06F 21/6209 |
| 2023/0041511 A1* | 2/2023 | Montgomery | G06F 1/26 |

FOREIGN PATENT DOCUMENTS

| | | | | |
|---|---|---|---|---|
| CN | 111864907 A | * | 10/2020 | ........ H02J 13/00001 |
| CN | 113573346 A | * | 10/2021 | ........... H04W 24/04 |
| CN | 114465987 A | * | 5/2022 | |
| EP | 3399722 A1 | | 11/2018 | |
| JP | 2001043220 A | * | 2/2001 | |
| JP | 2009295097 A | * | 12/2009 | |
| JP | 5342676 B1 | * | 11/2013 | |
| WO | WO-2010061530 A1 | * | 6/2010 | ............ H04L 41/00 |
| WO | WO-2011150716 A1 | * | 12/2011 | ............... G06F 8/54 |

OTHER PUBLICATIONS

Li, Cuihua. "Construction of the collection retrieval system of intelligent library based on cloud computing." In 2021 5th International Conference on Trends in Electronics and Informatics (ICOEI), pp. 1170-1173. IEEE, 2021. (Year: 2021).*

Valdez, Jason, Mina Guirguis, David Wingate, and Rory Rinkevich. "An expanding reference library for Peer-to-Peer content." In 2011 eCrime Researchers Summit, pp. 1-8. IEEE, 2011. (Year: 2011).*

* cited by examiner

| File Indicator | Data Handling Requirements |
|---|---|
| File 1 | Password Protection required |
| File 2 | Transmit via multiple channels |
| File 3 | Security assesment report required, password protection required |
| ... | ... |
| ... | ... |

TRANSMISSION OF SENSITIVE DATA IN A COMMUNICATION NETWORK

FIELD

Aspects described herein generally relate to the field of data security, and more specifically to transmission and processing of sensitive electronic data in a communication network.

BACKGROUND

An enterprise organization may operate in multiple jurisdictions, multiple industry sectors, may comprise of different departments/groups, etc. Each of these different aspects associated with operations of an enterprise organization may be subject to different requirements (e.g., rules, regulations, laws, etc.) for handling and processing of sensitive electronic data. Activities associated with an enterprise organization may require data transmission between different groups and/or across different jurisdictions. It is important that requirements associated with handling and processing of sensitive data are complied with during such data transmission and at a recipient of the data.

SUMMARY

Aspects of the disclosure provide solutions that address and overcome technical problems associated with management of data handling requirements in an enterprise network. Specifically, methods, devices, and systems as described herein may use data tagging to ensure that sensitive data is handled in a prescribed manner, even if such data is transmitted to a different region, jurisdiction, department, group, etc. Data tagging may enable data security and compliance with regulatory requirements to be maintained, for example, as per requirements of other jurisdictions that may be associated with the data, even if the data is transmitted outside those jurisdictions.

In accordance with one or more arrangements, a system for data transmission may comprise a plurality of computing networks. The plurality of computing networks may comprise at least: a first computing network comprising at least a first user computing device, a first data management platform, and a first reference library; and a second computing network comprising at least a second user computing device, a second data management platform, and a second reference library. The first data management platform may comprise at least one first processor and a memory storing first computer-readable instructions that, when executed by the at least one first processor, cause the first data management platform to perform one or more operations. The first data management platform may receive, from the first user computing device, a file for transmission outside of the first computing network. The first data management platform may determine first tagged data associated with the file based on the first tagged data. The first data management platform may identify, based on the first tagged data, one or more first data handling requirements for the file to meet security compliance on the first computing network. The first data management platform may generate a reference library entry corresponding to the file. The reference library entry may comprise an indicator of the file and the one or more first data handling requirements. The first data management platform may distribute the reference library entry to the plurality of computing networks. The distribution of the reference library entry may cause the reference library entry to be added to reference libraries associated with each the plurality of computing networks. The first data management platform may then send the file and the indicator of the file to the second user computing device. The second data management platform may comprise at least one second processor and a memory storing second computer-readable instructions that, when executed by the at least one second processor, cause the second data management platform to perform one or more operations. The second data management platform may receive the file and the indicator of the file. The second data management platform may retrieve the one or more first data handling requirements from the second reference library corresponding to the indicator of the file. The second data management platform may send the one or more first data handling requirements to the second user computing device before sending the file to the second user computing device. The second data management platform may send the file with the sensitive data to the second user computing device In some arrangements, the second data management platform may receive, from the second user computing device, second tagged data associated with the file. The second tagged data may indicate one or more second data handling requirements associated with the file. The second tagged data may update the reference library entry in the second reference library to include the one or more second data handling requirements; The second tagged data may distribute the one or more second data handling requirements to the plurality of computing networks. The distribution of the one or more second data handling requirements may cause the reference libraries associated with the plurality of computing networks to be updated to include the one or more second data handling requirements.

In some arrangements, the determining the first tagged data may be based on receiving the first tagged data from the computing device. In some arrangements, the determining the first tagged data may be based on natural language processing (NLP) of contents of the file.

In some arrangements, the one or more first data handling requirements may correspond to one of: a requirement that password protection is to be used for the file; a requirement that at least a portion of the file is to be encrypted for transmission; a requirement that the file is to transmitted via multiple communication channels; and combinations thereof.

In some arrangements, the first data management platform may receive, from the second data management platform, a second file. The first data management platform may determine, based on querying the first reference library, that the first reference library does not comprise a reference library entry corresponding to the second file. Based on determining that the first reference library does not comprise a reference library entry corresponding to the second file, send the file to the first user computing device without any data handling requirements.

In some arrangements, the first computing network and second computing network may correspond to private communication networks located in separate countries. In some arrangements, the first data management platform may send the file via a public communication network.

In some arrangements, the first data management platform may determine that the reference library comprises no reference library entry associated with the file. the first data management platform may generate the reference library entry after the determining that the reference library comprises no reference library entry associated with the file.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Electronic data handled by enterprise organizations may be subject to privacy, secrecy, and/or regulatory requirements/restrictions. The electronic data may correspond to client information, health information, trade secrets, etc. For example, if an enterprise organization is a financial enterprise, the electronic information may correspond to financial records associated with a client. If an enterprise organization is operating in the health sector, the electronic data may correspond to personal health records associated with individuals. The requirements/restrictions may be placed on data to ensure that the data remains private and/or restricted for access by authorized users associated with the enterprise organization. Example restrictions may include use of password protection, encryption/masking of data, usage of separate communication channels for transmission of subsets of data, obtaining regulatory approval (e.g., from regulatory agencies) for data transmission to other organizations, etc.

The requirements associated with the data may be maintained in records associated with the electronic data. For example, the electronic data may be associated with tagged data that indicates the various requirements associated with the data. If the electronic data is maintained in a single private network associated with the enterprise organization, these requirements may be readily accessible to various users associated with the private network. However, if the data is being transmitted to another organizations, another private network associated with the organization (e.g., located in a different region/country), etc., these requirements may not necessarily be accessible to users associated with a recipient organization/network. While a sender may manually add these requirements when transmitting the data, this may be time consuming, may be subject to human errors, or may not be readily accessible to users of a recipient organization/network.

Consider an example where a financial organization maintains multiple offices in different countries, each subject to corresponding requirements for handling client financial records. Suppose a first office, of the financial organization, located in the first country needs to transmit financial records associated with a client to a second office, of the financial organization, located in a second country. The first office may have put in place a requirement that any data associated with the client needs to be password protected (e.g., base on a privacy agreement with the client). If this data is transmitted to the second office, this requirement must remain in place for the data even at the second office. The second office must be notified of this requirement when the data is transmitted to the second office. Now, if this second office is subject to a regulatory requirement that any data transmission to another country needs to be approved by a regulatory agency of the second country, the second office needs to abide by both the password protection requirement of the first office as well as the regulatory approval requirement. These two requirements must be abided by even if the second office transmits the data to a third office, of the enterprise organization (or of a different enterprise organization), which may be located in the third country. These multiple requirements may add up when the data is being moved across the different countries during various processes that the enterprise organization may follow for handling the client data and/or providing financial services to the client. Manually maintaining these requirements associated with the data may be labor intensive and may result in errors when multiple countries/offices are involved during the data handling process. Thus, there is a need for a mechanism to ensure that these requirements follow data as it is being moved across offices, networks, countries, each of which may have their own requirements/regulations to abide by.

Various examples herein systems, methods, and apparatuses for ensuring data being handled by different networks (e.g., located in different offices, countries, etc.) is tagged with data handling requirements associated with all networks. Each network may be associated with a corresponding reference library that may maintain indicators of files and corresponding data handling requirements associated with the file. When a first data management platform, associated with a first network, receives a file tagged with one or more data handling requirements, the first data management platform may add an indicator of the file and the one or more data handling requirements to a reference library entry in the first reference library. The first data management platform may distribute the reference library entry to the plurality of networks, wherein the distribution of the reference library entry causes the reference library entry to be added to reference libraries associated with the plurality of networks. When a user computing device associated with the first network transmits the file to a second network (e.g., a user computing device associated with the second network), a second data management platform associated with the second network may retrieve, based on the indicator of the file, the one or more data handling requirements from the reference library entry as added to the second reference library. The second data management platform may send the file and the one or more data handling requirements to the second user computing device. In this manner, the second network and the second user computing device may be notified of any data handling requirements, associated with the file, as may be tagged in the first network.

Figure 1A:
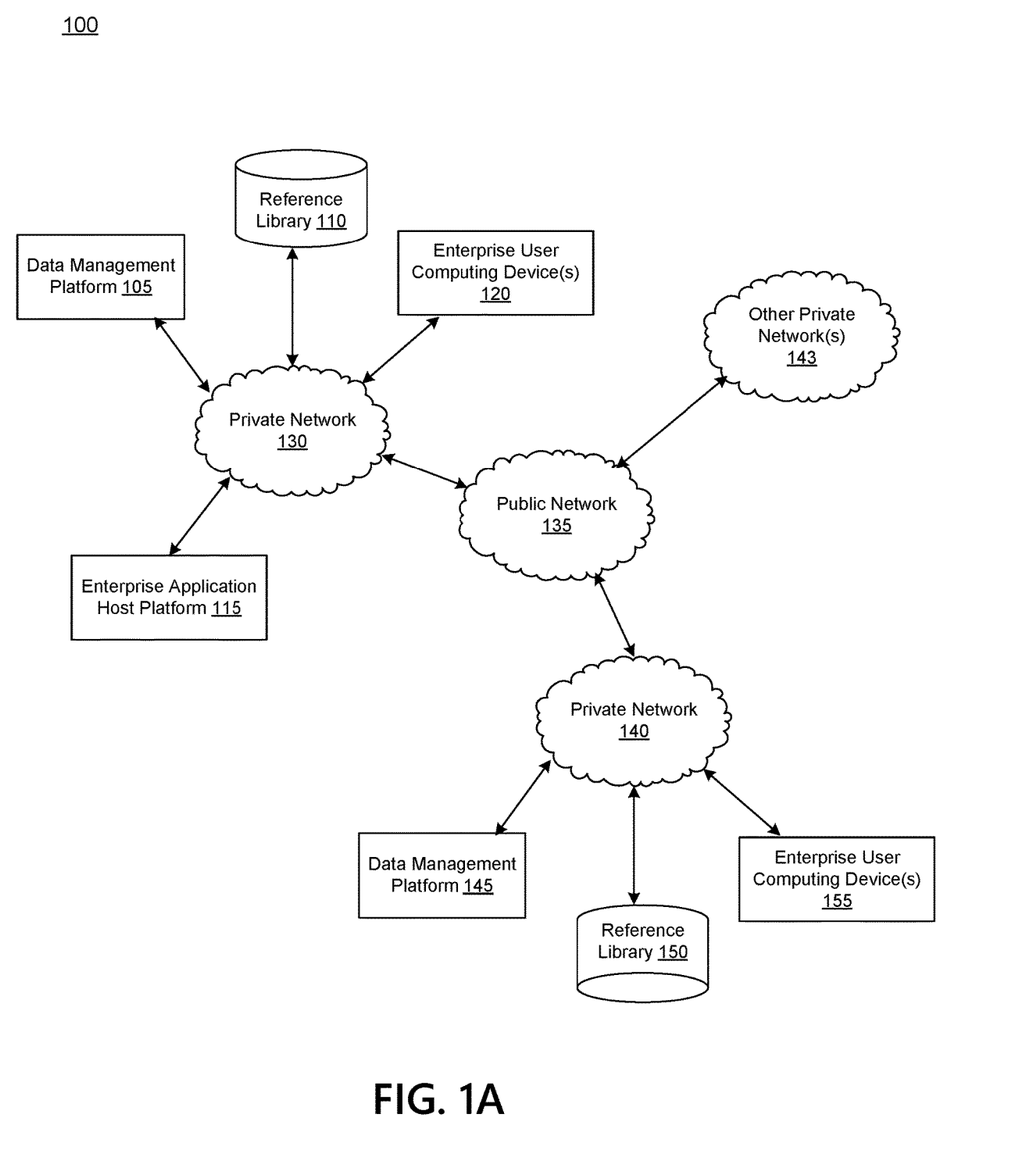
FIG. 1A shows an illustrative computing environment in which a data management system for processing sensitive data may be deployed, in accordance with one or more example arrangements.

FIG. 1A shows an illustrative computing environment 100 in which a data management system for processing sensitive data may be deployed, in accordance with one or more arrangements. The computing environment 100 may comprise one or more devices (e.g., computer systems, communication devices, and the like). The computing environment 100 may comprise, for example, a data management platform 105, a reference library 110, an enterprise application host platform 115, and/or one or more enterprise user computing devices 120. The one or more of the devices and/or systems, may be linked over a private network 130 associated with an enterprise organization (e.g., a financial institution).

The computing environment 100 may additionally comprise one or more external devices/systems (e.g., in a private network 140, other private networks 143) connected, via a public network 135, to the devices in the private network 130. The different private networks (e.g., the private network 130, the private network 140, the other private networks 143) may correspond different offices of the enterprise organization that may be located in different regions/country/jurisdictions, or may correspond to different associated enterprise organizations. The computing devices associated with each of the private networks may create, modify and/or exchange sensitive data/information, in accordance with various protocols described herein. Devices in these different private networks may be similar to those in the private network 130. For example, a data management platform 145, a reference library 150, and/or one or more enterprise user computing devices 155 in the private network 140 may be similar, or substantially similar to the data management platform 105, the reference library 110, and the one or more enterprise user computing devices 120, respectively. Similarly, the other private networks 143 may have similar devices/systems as the private network 130 or the private network 140.

The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3$^{rd}$ Generation Partnership Project (3GPP) cellular protocol, a hypertext transfer protocol (HTTP), and the like).

The data management platform 105 may comprise one or more computing devices and/or other computer components (e.g., processors, memories, communication interfaces) configured to perform one or more functions as described herein. Further details associated with the architecture of the data management platform 105 are described with reference to FIG. 1B.

The enterprise application host platform 115 may comprise one or more computing devices and/or other computer components (e.g., processors, memories, communication interfaces). In addition, the enterprise application host platform 115 may be configured to host, execute, and/or otherwise provide one or more enterprise applications. In an arrangement where the private network 130 is associated with a banking/financial organization, the enterprise application host platform 115 may be configured, for example, to host, execute, and/or otherwise provide one or more transaction processing programs, such as an online banking applications, fund transfer applications, data transmission applications, and/or other programs associated with the financial institution. The enterprise application host platform 115 may comprise various servers and/or databases that store and/or otherwise maintain account information, such as financial account information including account balances, transaction history, account owner information, and/or other information. In addition, the enterprise application host platform 115 may process and/or otherwise execute transactions on specific accounts based on commands and/or other information received from other computer systems comprising the computing environment 100.

The enterprise user computing device(s) 120 may be personal computing devices (e.g., desktop computers, laptop computers) or mobile computing devices (e.g., smartphones, tablets). In addition, the enterprise user computing device(s) 120 may be linked to and/or operated by specific enterprise users (who may, for example, be employees or other affiliates of the enterprise organization). The enterprise user computing device(s) 120 may be used to interact with, update, and/or modify the reference library 110. The enterprise user computing device(s) 120 may be used to send data/files to one or more other devices within the private network 130 or other networks (e.g., the enterprise user computing device(s) 155 in the private network 140).

In one or more arrangements, the data management platform 105, the enterprise application host platform 115, the enterprise user devices 120, the reference library 110, the data management platform 145, the enterprise user devices 155, the reference library 150, and/or the other devices/systems in the computing environment 100 may be any type of computing device capable of receiving input via a user interface, and communicating the received input to one or more other computing devices in the computing environment 100. For example, the data management platform 105, the enterprise application host platform 115, the enterprise user devices 120, the reference library 110, the data management platform 145, the enterprise user devices 155, the reference library 150, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the data management platform 105, the enterprise application host platform 115, the enterprise user devices 120, the reference library 110, the data management platform 145, the enterprise user devices 155, the reference library 150, and/or the other devices/systems in the computing environment 100 may, in some instances, be and/or comprise special-purpose computing devices configured to perform specific functions.

Figure 1B:
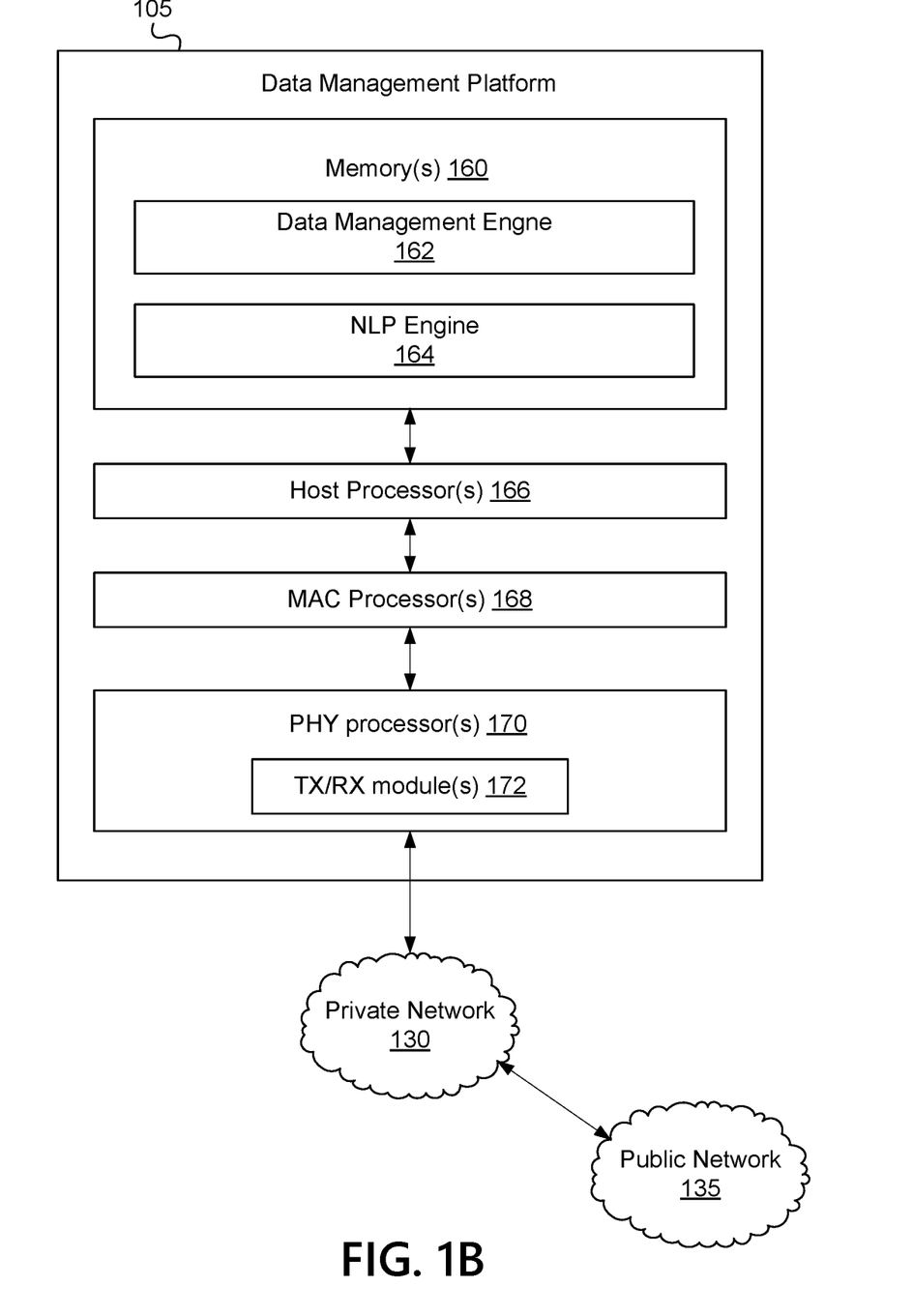
FIG. 1B shows an example data management platform, in accordance with one or more example arrangements.

FIG. 1B shows an example data management platform 105 in accordance with one or more examples described herein. The data management platform 105 may comprise one or more of host processor(s) 166, medium access control (MAC) processor(s) 168, physical layer (PHY) processor(s) 170, transmit/receive (TX/RX) module(s) 172, memory 160, and/or the like. One or more data buses may interconnect host processor(s) 166, MAC processor(s) 168, PHY processor(s) 170, and/or Tx/Rx module(s) 172, and/or memory 160. The data management platform 105 may be implemented using one or more integrated circuits (ICs), software, or a combination thereof, configured to operate as discussed below. The host processor(s) 166, the MAC processor(s) 168, and the PHY processor(s) 170 may be implemented, at least partially, on a single IC or multiple ICs. Memory 160 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 168 and/or the PHY processor(s) 170 of the data management platform 105 may be configured to generate data units, and process received data units, that conform to any suitable wired and/or wireless communication protocol. For example, the MAC processor(s) 168 may be configured to implement MAC layer functions, and the PHY processor(s) 170 may be configured to implement PHY layer functions corresponding to the communication protocol. The MAC processor(s) 168 may, for example, generate MAC data units (e.g., MAC protocol data units (MPDUs)), and forward the MAC data units to the PHY processor(s) 170. The PHY processor(s) 170 may, for example, generate PHY data units (e.g., PHY protocol data units (PPDUs)) based on the MAC data units. The generated PHY data units may be transmitted via the TX/RX module(s) 172 over the private network 130. Similarly, the PHY processor(s) 170 may receive PHY data units from the TX/RX module(s) 172, extract MAC data units encapsulated within the PHY data units, and forward the extracted MAC data units to the MAC processor(s). The MAC processor(s) 168 may then process the MAC data units as forwarded by the PHY processor(s) 170.

One or more processors (e.g., the host processor(s) 166, the MAC processor(s) 168, the PHY processor(s) 170, and/or the like) of the data management platform 105 may be configured to execute machine readable instructions stored in memory 160. The memory 160 may comprise one or more program modules/engines having instructions that when executed by the one or more processors cause the data management platform 105 to perform one or more functions described herein. The one or more program modules/engines and/or databases may be stored by and/or maintained in different memory units of the data management platform 105 and/or by different computing devices that may form and/or otherwise make up the data management platform 105. For example, the memory 160 may have, store, and/or comprise a data management engine 162 and a natural language processing (NLP) engine 164. The data management engine 162 may have instructions that direct and/or cause the data management platform 105 to perform one or more operations such as querying and/or editing the reference library 110, transmission of messages to other networks (e.g., for updating of corresponding reference libraries, data transmission between different private networks), etc. The NLP engine 164 may have instructions that direct and/or cause the data management platform 105 to parse text data that is prepared for transmission, and based on the parsing, identify specific clients, regions, countries that may be associated with the data. Based on this determination, the data management platform 105 may determine data handling requirements for the data, as further described herein.

While FIG. 1A illustrates the data management platform 105, the enterprise application host platform 115, the reference library 110, and the enterprise user devices 120, as being separate elements connected in the private network 130, in one or more other arrangements, functions of one or more of the above may be integrated in a single device/network of devices. For example, elements in the data management platform 105 (e.g., host processor(s) 166, memory(s) 160, MAC processor(s) 168, PHY processor(s) 170, TX/RX module(s) 172, and/or one or more program/modules stored in memory(s) 160) may share hardware and software elements with and corresponding to, for example, the enterprise application host platform 115 and/or the enterprise user devices 120.

Figure 2A:
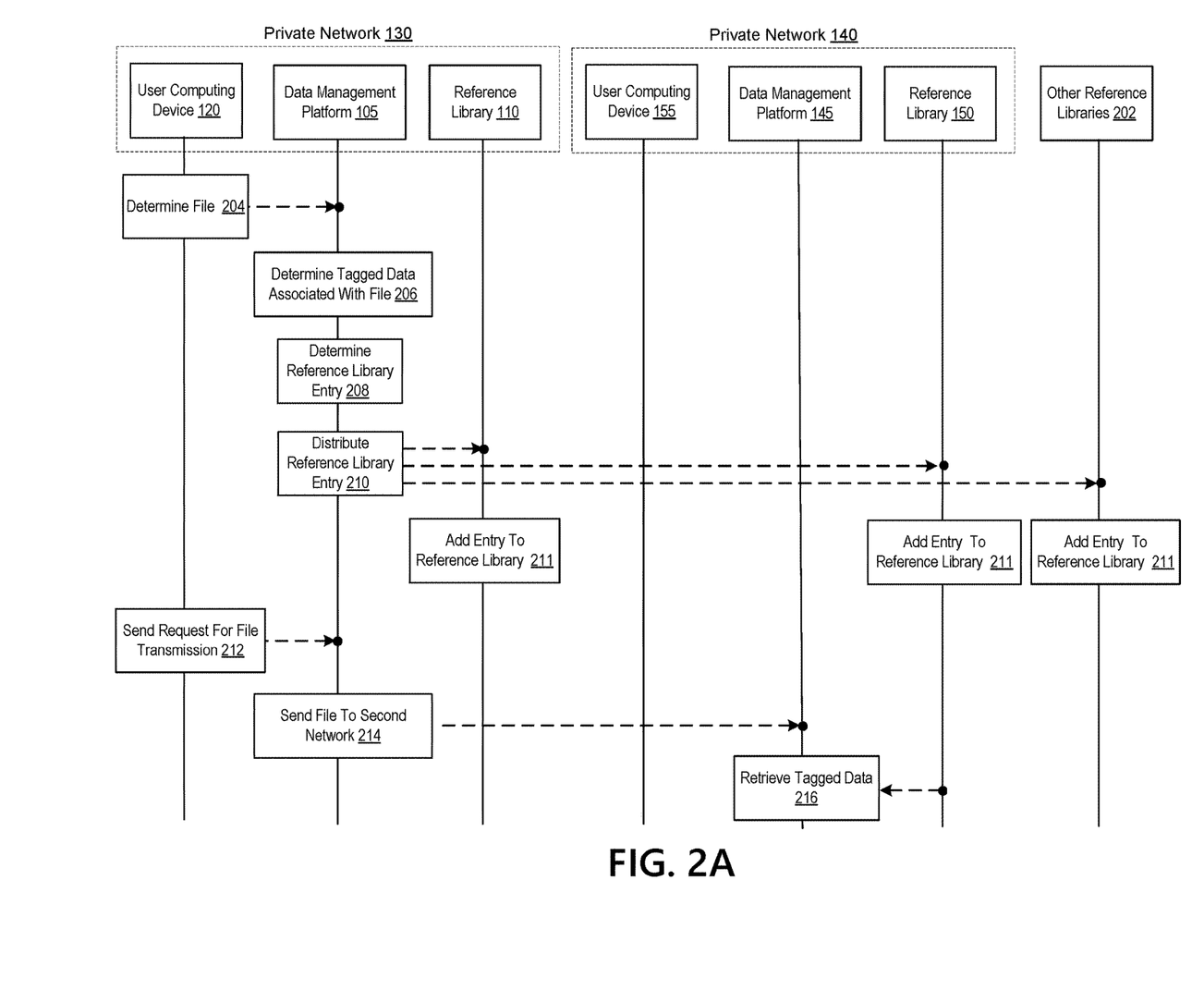
FIGS. 2A and 2B shows an example event sequence for processing and communicating sensitive data across multiple networks, in accordance with one or more example arrangements.
Figure 2B:
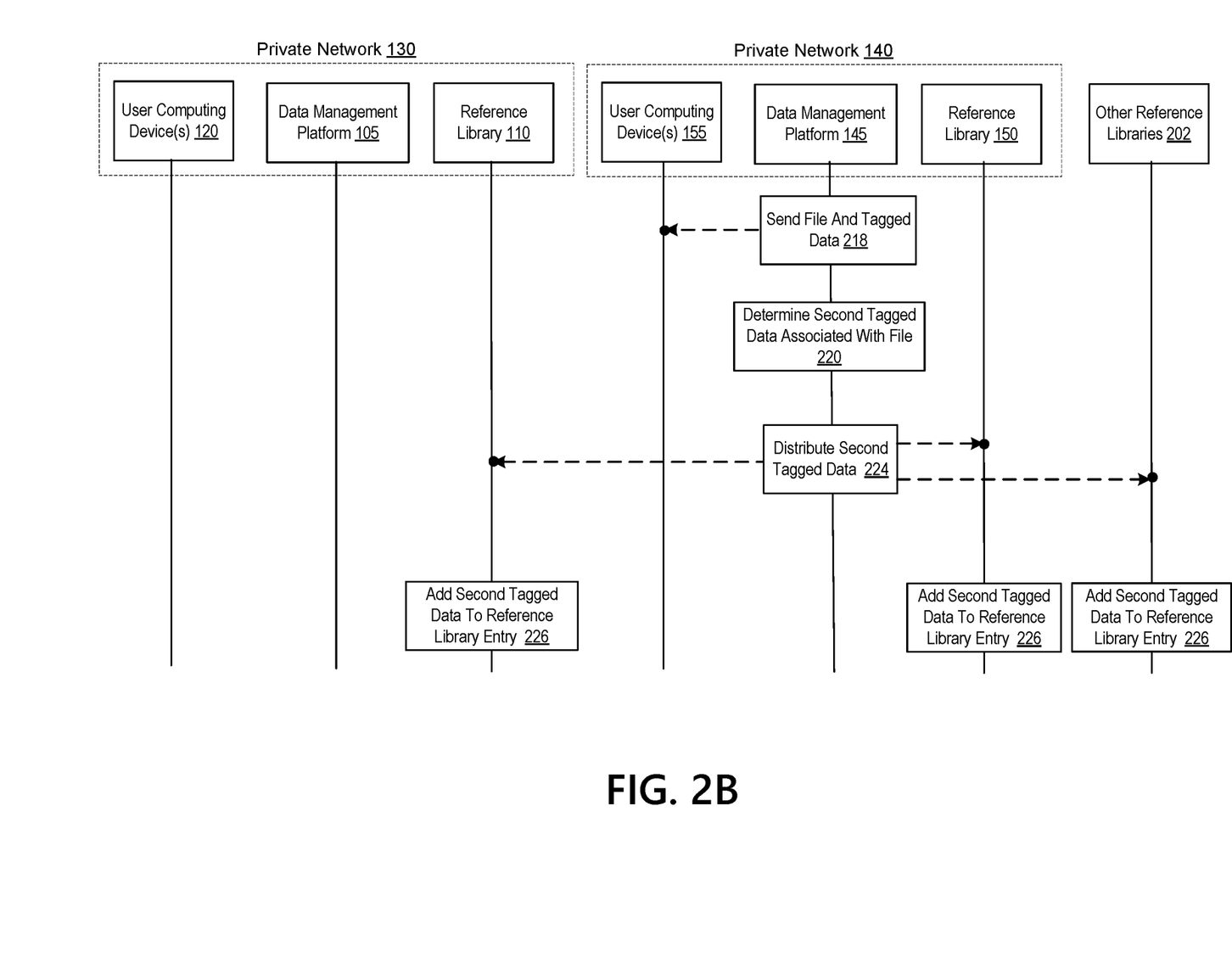

FIGS. 2A and 2B shows an example event sequence for processing and communicating sensitive data across multiple networks. Processing of sensitive data may comprise provisioning and updating of data handling requirements, associated with the sensitive data, across all private networks that may handle the data. The example event sequence is described with respect to the computing environment 100 of FIG. 1 within which the sensitive data is to be generated/exchanged. In an arrangement, the example event sequence corresponds to file transfer between two different private networks (e.g., private network 130 and private network 140) among a plurality of private networks in the computing environment 100. The plurality of private networks may correspond to different offices (e.g., as may be located in different regions/countries/jurisdictions) of a same enterprise organization, or may correspond to different enterprise organizations that may generate, modify and/or exchange sensitive data.

At step 204, the user computing device 120 may determine a file associated with the private network 130. The file may comprise, for example, sensitive data (e.g., data that may be subject to privacy, secrecy, and/or regulatory requirements/restrictions). The file may be stored in a database server associated with the private network 130, or may be generated based on user input at the user computing device 120 of the private network 130. The user computing device 120 may send the file to the data management platform 105 associated with the private network 130. The file may be associated with a file indicator (e.g., a file name, a numeric value, etc.). The file indicator may be unique across all networks within the computing environment 100. While FIGS. 2A and 2B are described with respect to transmission of a single file between networks, similar procedures may be used for communicating data as may be stored in multiple files.

At step 206, the data management platform 105 may determine tagged data associated with the file. The tagged data may indicate one or more data handling requirements that may be associated with the file (e.g., sensitive data comprising the file). In an arrangement, one or more data handling requirements may comprise one or more of: a requirement that password protection is to be used for the file, a requirement that at least a portion of the file is to be encrypted (e.g., as per an established standard), a requirement that different portions of the file are to be transmitted via different communication channels, a requirement that regulatory permission is to be obtained prior to transmission to external networks, etc. The data handling requirements may be based on one or more of: a client associated with the file, a type of data (e.g., financial records, personal records, health records, etc.) stored in the file, a location (e.g., jurisdiction, country, etc.) of the private network 130, a source country of the data stored in the file, a destination country of the data stored in the file, a source organization of the data stored in the file, a destination organization of the data stored in the file, etc. Additionally, or alternatively, the one or more data handling requirements may be based on one or more of: data handling policies enforced by the enterprise organization associated with the private network 130, client agreements relating to management of data associated with the client, regulatory requirements associated with a country within which the enterprise organization or the office corresponding to the private network 130 is located in, etc.

For example, the private network 130 (e.g., associated with a financial organization) may be located in country A and the file may correspond to financial records associated with a particular client. In this scenario, the data handling requirements may comprise that the file is to be password protected during storage/transmission (e.g., to avoid unauthorized access) and that regulatory permission (e.g., a security assessment report) needs to be obtained from a regulatory authority associated with country A prior to transmission to an external network located in a different country (e.g., the private network 140 in country B).

In an arrangement, the tagged data may be input by a user at the user computing device 120 and may be sent along with the file to the data management platform 105. In an arrangement, the tagged data may be determined based on analysis by an NLP engine at the data management platform 105. The NLP engine 164 may be trained to identify patterns associated with data within the file using a machine learning (ML) model. Based on identified patterns, the NLP engine 164 may determine metadata associated with the file. The metadata may comprise one or more of a client name, a client identifier, a type of the data (e.g., financial records, personal records, health records, etc.), a source country of the data, a destination country of the data, a source organization of the data, a destination organization of the data, etc. The data handling requirements may be determined by the data handling platform 105 based on the metadata. For example, the data handling platform 105 may query a repository that stores different data handling requirements, categorized by client names, client identifiers, types of data, source countries, destination countries, source organizations, destination organizations, etc., to determine data handling requirements corresponding to the file based on the identified metadata.

With reference to the example where the file corresponds to financial records associated with a particular client, for example, the NLP engine 164 may identify the client based on analysis of the file. The data management platform 105 may query the repository based on the identified client and determine that files associated with the client must use password protection. The NLP engine 164 may further determine that a destination network for the file (e.g., private network 140) is located in a different country (country B). The data management platform 105 may query the repository and determine that regulatory permission (e.g., a security assessment report) needs to be obtained from a regulatory authority associated with country A if sending the file to country B. The NLP engine 164 may further determine that the file includes data associated with citizens located in a third country (e.g., country C). The data management platform 105 may query the repository and determine that data security requirements associated with country C (e.g., encryption) needs to be used for the file.

At step 208, the data management platform 105 may determine/generate a reference library entry for the file. The reference library entry may comprise the indicator of the file and further comprise the tagged data (e.g., the one or more data handling requirements) associated with the file. The data management platform 105 may add the reference library entry to the reference library 110.

Figure 3:
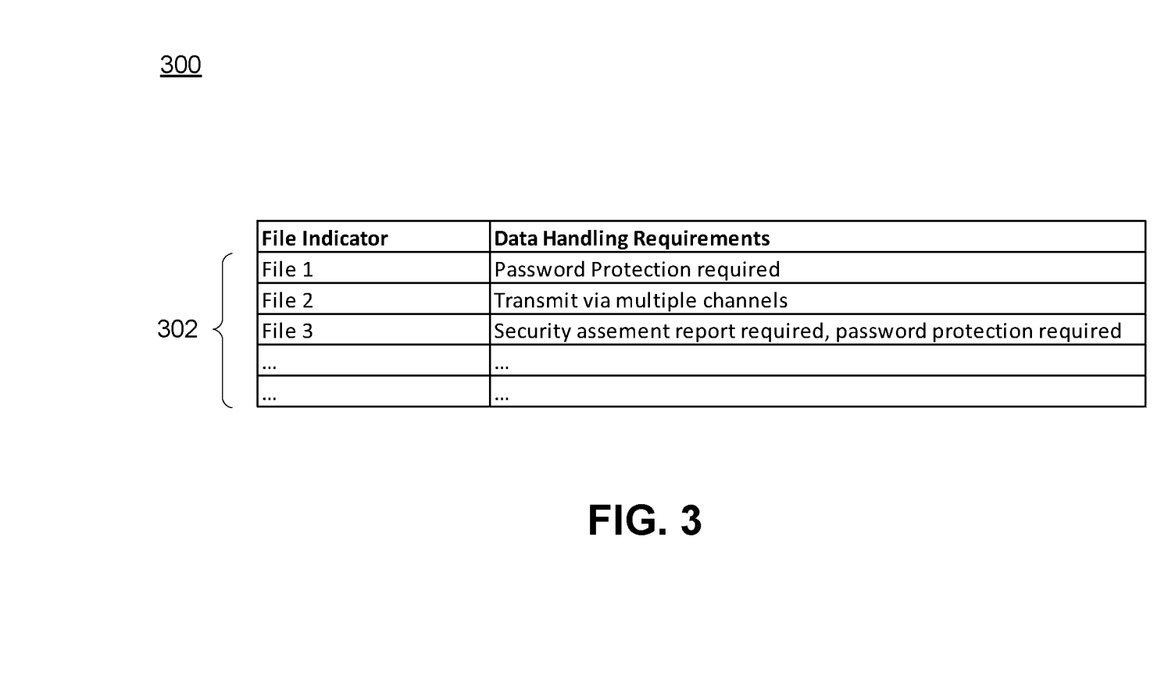
FIG. 3 shows an example table of reference library entries as stored in a reference library, in accordance with one or more example arrangements.

FIG. 3 shows example table 300 of reference library entries as stored in the reference library 110. As shown in FIG. 3, each of the entries 302 in the table 300 in the reference library 110 may comprise file indicators and corresponding data handling requirements of files associated with the file indicators. File 1, for example, may have a data handling requirement that password protection is to be used for file 1 (e.g., such that file 1 may only be accessed with a password). File 2, for example, may have a data handling requirement that the file should only be transmitted via at least two communication channels. For example, a first portion of the file may be transmitted via email, while a second portion of the file may be stored in a secure server and only the link associated with the file location on the secure server may be transmitted. File 3, for example, may have a first data handling requirement that a security assessment report must be obtained prior to file transmission to an external network. File 3 may have an additional second data handling requirement that password protection is to be used for file 1.

At step 210, the data management platform 105 may distribute the reference library entry to reference libraries, associated with private networks (e.g., private network 140, other private networks 143) within the computing environment 100. The distribution of the reference library entry may cause it to be added to each of the reference libraries of the private networks (e.g., step 211). For example, the data management platform 105 of the private network 130 may send the reference library entry to the data management platform 145 of the private network 140. The data management platform 145, based on receiving the reference library entry, may add the reference library entry to the reference library 150. Similarly, the other private networks 143, based on receiving the reference library entry, may add the reference library entry to their corresponding reference libraries 202. In this manner, all reference libraries within the computing environment 100 may be synchronized to carry same information regarding data handling requirements associated with files generated and/or stored at any one of the private networks.

At step 212, the user computing device 120 may send, to the data management platform 105, a request for transmission of the file to the user computing device 155 associated with the private network 140. The data management platform 105 may send, based on receiving the request, the file to the data management platform 145. Alternatively, the user computing device 120 (or any other device/server within the private network 130) may directly send the file to the data management platform 145. Sending the file may comprise sending the file along with an indicator of the file.

At step 216, the data management platform 145 may, based on the indicator of the file, query the reference library 150 associated with the private network 140. The data management platform 145 may query the reference library 150 to determine/retrieve the reference library entry (e.g., as was added to the reference library 150 in step 211) based on the indicator of the file. As was described above, the reference library entry may include tagged data associated with the file.

At step 218, the data management platform 145 may send the file and the tagged data to the user computing device 155 and/or may store the file in a server associated with the private network 140. In this manner, a user associated with the user computing device 155 may be able to access any data handling requirements, associated with the file, as may have been determined at the private network 130.

The private network 140 may have its own second data handling requirements associated with the file. For example, if the private network 140 is located in a country that is different from that of the private network 130, the second data handling requirements may be based on regulatory requirements associated with that country. As another example, if the private network 140 is associated with a second enterprise organization that is from the enterprise organization corresponding to the private network 130, the second enterprise organization may have its own set of data management policies.

At step 218, the data management platform 105 may determine second tagged data associated with the file. The second tagged data may indicate the second data handling requirements that may be associated with the file. The second tagged data may be determined in a similar manner to, and based on same considerations, as described with respect to step 206 of FIG. 2A.

At step 224, the data management platform 145 may distribute the second tagged data to reference libraries, associated with private networks (e.g., private network 140, other private networks 143) within the computing environment 100. The distribution of the second tagged data may cause the reference library entry for the file, in each of the reference libraries, to be updated to include the second tagged data that indicates the second data handling requirements (e.g., step 211). For example, the data management platform 145 of the private network 140 may send the second tagged data to the data management platform 105 of the private network 130. The data management platform 145, based on receiving the second tagged data, may update the reference library entry in the reference library 110 to include the second tagged data. Similarly, the other private networks 143, based on receiving the to include the second tagged data, may update the reference library entry in each of their respective reference libraries 202 to include the second tagged data. In this manner, all reference libraries within the computing environment 100 may be updated/revised in a synchronized manner to carry same information regarding data handling requirements associated with files generated and/or stored at any one of the private networks.

For example, the data handling requirements (e.g., as determined at step 206) may comprise that the file is to be password protected during storage/transmission and that regulatory permission (e.g., a security assessment report) needs to be obtained from a regulatory authority prior to transmission to an external network located in a different country. A reference library entry for the file may comprise the indicator of the file and further indicate these data handling requirements. The reference library entry may be distributed to a plurality of private networks (e.g., including the private network 140) within the computing environment 100. Based on receiving the reference library entry, the reference libraries at each of the plurality of private networks may be updated to include the received reference library entry. At the private network 140, the data management platform 145 may determine second data handling requirements associated with the file, and distribute the second data handling requirements to the plurality of private networks. For example, a second data handling requirement may comprise that data associated with the file must be transmitted via two different communication channels. Based on receiving the second data handling requirements, the reference libraries at each of the plurality of private networks may be updated to additionally include the second data handling requirements.

Figure 4:
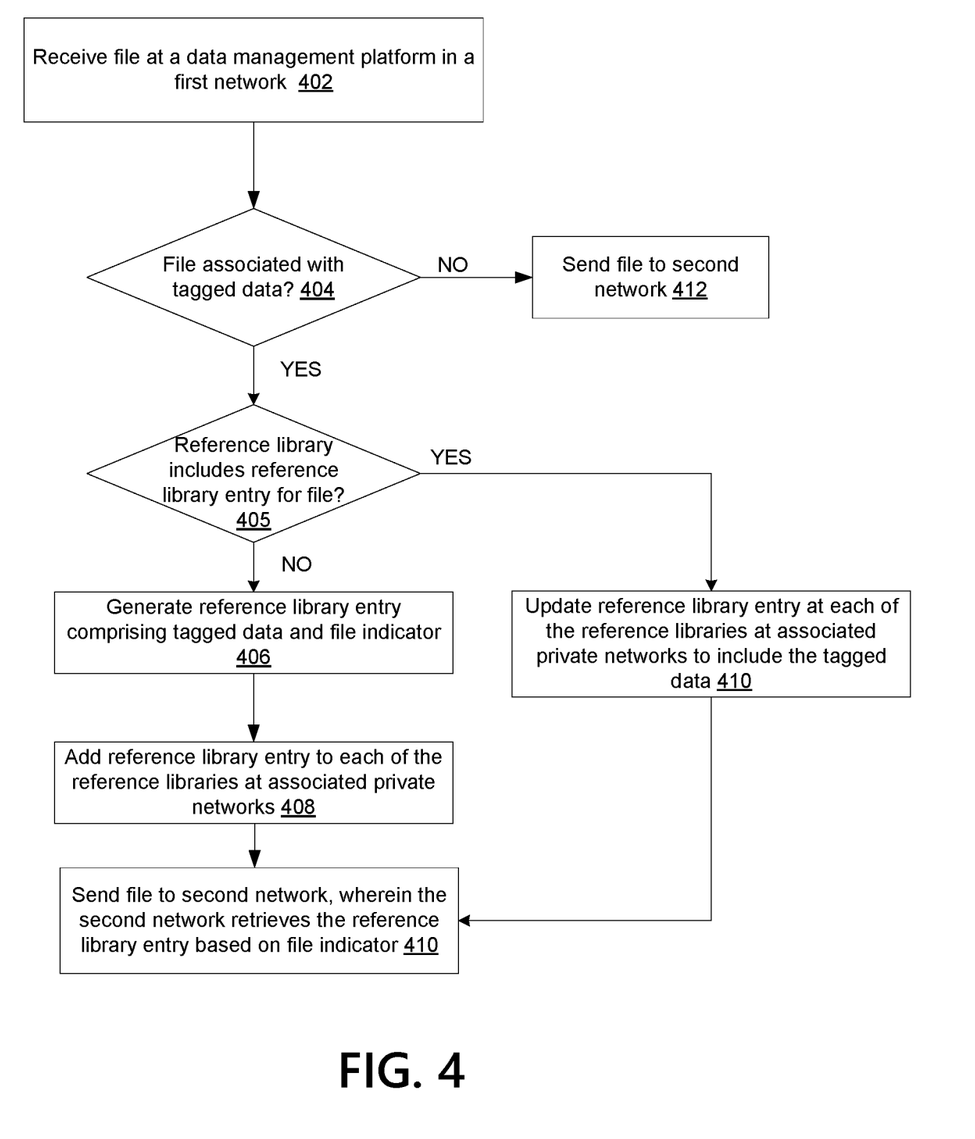
FIG. 4 shows an example algorithm performed by a data management platform, in accordance with one or more example arrangements.

FIG. 4 shows an example algorithm performed by a data management platform, in accordance with one or more example arrangements. At step 402, the data management platform in a first network may receive a file (e.g., from a user computing device) for transmission to a second network. At step 404, the data management platform may determine whether the file is associated with any tagged data comprising data handling requirements. In an example, the data handling requirements may be input at the user computing device, or may be determined based on NLP of the file at the data management platform. At step 412, and if the file is not associated with any tagged data, the file may be transmitted to the second network.

At step 405, and if the file is associated with tagged data, the data handling platform may determine if a reference library associated with the first network includes a reference library entry for the file. For example, the data handling platform may query the reference library based on the file indicator to determine if the reference library includes the reference library entry for the file. At step 410, and if the reference library includes the reference library entry for the file, the data handling platform may update the reference library entry to include the tagged data. Further, the data handling platform may distribute the tagged data to each of the reference libraries, of associated private networks, in the computing environment. Based on the received tagged data, the reference library entry at each of the reference libraries may be updated to include the tagged data.

At step 406, and if the reference library does not include the reference library entry for the file, the data management platform may generate a reference library entry comprising the tagged data and the file indicator. At step 408, the data management platform may add the reference library entry to the reference library associated with the first network. Further, the data handling platform may distribute the reference library entry to each of the reference libraries, of the associated private networks, in the computing environment. Based on the received reference library entry, the reference libraries may be updated to include the reference library entry.

At step 410, the data management platform may send the file to the second network. Based on receiving the file and based on the file indicator, the second network (e.g., a second data management platform of the second network) may retrieve the reference library entry for the file from a reference library associated with the second network. The file and the reference library entry may be sent to a second user computing device of the second network.

Systems, device, and methods as described herein may provide enhanced and efficient distribution of data handling requirements for a file/data among a plurality of associated private networks. Further, each of the private networks may add additional data handling requirements for the file/data. These additional data handling requirements may be distributed to the plurality of associated private networks. Distribution of data handling requirements and updating of the data handling requirements among the plurality of associated private networks may ensure that all security and regulatory requirements corresponding to the file/data are accessible to and complied with at each of the associated private networks.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system for enabling security-compliant data transmissions among geographically diverse computing networks using distributed reference libraries, the system comprising:
   a first computing network comprising at least a first user computing device, a first data management platform, and a first reference library; and
   a second computing network comprising at least a second user computing device, a second data management platform, and a second reference library;
   wherein the first data management platform is configured to:
      receive, from the first user computing device, a file including sensitive data for transmission outside of the first computing network;
      determine first tagged data associated with the sensitive data in the file;
      identify, based on the first tagged data, one or more first data handling requirements for the file to meet security compliance on the first computing network;
      determine, for storing in one or more reference libraries, a reference library entry corresponding to and separate from the file, wherein the reference library entry comprises an indicator of the file, and wherein the first data management platform is configured to determine the reference library entry by:
         if the first reference library includes the reference library entry corresponding to the file, updating the reference library entry to additionally include the one or more first data handling requirements, and
         if the first reference library does not include the reference library entry corresponding to the file, generating the reference library entry, wherein the generated reference library entry includes the one or more first data handling requirements;
      distribute the reference library entry to a plurality of computing networks comprising at least the first computing network and the second computing network, wherein the distribution of the reference library entry causes the reference library entry to be added to reference libraries associated with each of the plurality of computing networks, and wherein the distribution of the reference library entry does not comprise transmission of the file; and
      send the file and the indicator of the file to the second user computing device; and
   wherein the second data management platform is configured to:
      receive the file and the indicator of the file;
      retrieve the one or more first data handling requirements, from the second reference library, corresponding to the indicator of the file;
      send the one or more first data handling requirements to the second user computing device before sending the file to the second user computing device; and
      send the file with the sensitive data to the second user computing device.

2. The system of claim 1, wherein the second data management platform is configured to:
   receive, from the second user computing device, second tagged data associated with the file, wherein the second tagged data indicates one or more second data handling requirements associated with the file;
   update the reference library entry in the second reference library to include the one or more second data handling requirements; and
   distribute the one or more second data handling requirements to the plurality of computing networks, wherein the distribution of the one or more second data handling requirements causes the reference libraries associated with the plurality of computing networks to be updated to add the one or more second data handling requirements.

3. The system of claim 1, wherein the first data management platform is configured to determine the first tagged data associated with the file by causing determining the first tagged data based on receiving the first tagged data from the first user computing device.

4. The system of claim 1, wherein first data management platform is configured to determine the first tagged data associated with the file by causing determining the first tagged data based on natural language processing (NLP) of contents of the file.

5. The system of claim 1, wherein the one or more first data handling requirements correspond to one of:
   a requirement that password protection is to be used for the file;
   a requirement that at least a portion of the file is to be encrypted for transmission;
   a requirement that the file is to transmitted via multiple communication channels; and
   combinations thereof.

6. The system of claim 1, wherein the first data management platform is configured to:
   receive, from the second data management platform, a second file;
   determine, based on querying the first reference library, that the first reference library does not comprise a reference library entry corresponding to the second file; and
   based on determining that the first reference library does not comprise a reference library entry corresponding to the second file, send the file to the first user computing device without any data handling requirements.

7. The system of claim 1, wherein the first computing network and second computing network correspond to private communication networks located in separate countries, and wherein the first data management platform is configured to send the file by causing sending the file via a public communication network.

8. A method comprising:
   receiving, at a first data management platform and from a first user computing device associated with a first computing network, a file including sensitive data for transmission outside of the first computing network, wherein the first computing network comprises a first reference library;
   determining first tagged data associated with the sensitive data in the file;
   identify, based on the first tagged data, one or more first data handling requirements for the file to meet security compliance on the first computing network;
   determining, for storing in one or more reference libraries, a reference library entry corresponding to and separate from the file, wherein the reference library entry comprises an indicator of the file, and wherein the determining the reference library entry comprises:
      if the first reference library includes the reference library entry corresponding to the file, updating the reference library entry to additionally include the one or more first data handling requirements, and
      if the first reference library does not include the reference library entry corresponding to the file, generating the reference library entry, wherein the generated reference library entry includes the one or more first data handling requirements;
   distributing the reference library entry to a plurality of computing networks comprising at least the first computing network and a second computing network, wherein the distribution of the reference library entry causes the reference library entry to be added to reference libraries associated with each of the plurality of computing networks, and wherein the distribution of the reference library entry does not comprise transmission of the file; and
   sending the file and the indicator of the file to a second user computing device associated with the second computing network among the plurality of computing networks, wherein the indicator of the file is used at the second computing network to determine the one or more first data handling requirements from a second reference library associated with the second computing network.

9. The method of claim 8, wherein the determining the first tagged data associated with the file is based on receiving the first tagged data from the first user computing device.

10. The method of claim 8, wherein the determining the first tagged data associated with the file is based on natural language processing (NLP) of contents of the file.

11. The method of claim 8, wherein the one or more first data handling requirements correspond to one of:
   a requirement that password protection is to be used for the file;
   a requirement that at least a portion of the file is to be encrypted for transmission;
   a requirement that the file is to transmitted via multiple communication channels; and
   combinations thereof.

12. The method of claim 8, further comprising:
   receiving, from a second data management platform, a second file;
   determining, based on querying the first reference library, that the first reference library does not comprise a reference library entry corresponding to the second file; and
   based on determining that the first reference library does not comprise a reference library entry corresponding to the second file, sending the file to the first user computing device without any data handling requirements.

13. The method of claim 8, wherein the first computing network and second computing network correspond to private communication networks located in separate countries and wherein the sending the file comprises sending the file via a public communication network.

14. A non-transitory computer readable medium storing instructions that, when executed, cause a first data management platform to:
   receive, from a first user computing device associated with a first computing network, a file including sensitive data for transmission outside of the first computing network, wherein the first computing network comprises a first reference library;
   determine first tagged data associated with the sensitive data in the file;
   identify, based on the first tagged data, one or more first data handling requirements for the file to meet security compliance on the first computing network;
   determine, for storing in one or more reference libraries, a reference library entry corresponding to and separate from the file, wherein the reference library entry comprises an indicator of the file, and wherein the determining the reference library entry comprises:
      if the first reference library includes the reference library entry corresponding to the file, updating the reference library entry to additionally include the one or more first data handling requirements, and if the first reference library does not include the reference library entry corresponding to the file, generating the reference library entry, wherein the generated reference library entry includes the one or more first data handling requirements;

distribute the reference library entry to a plurality of computing networks comprising at least the first computing network and a second computing network, wherein the distribution of the reference library entry causes the reference library entry to be added to reference libraries associated with each of the plurality of computing networks, and wherein the distribution of the reference library entry does not comprise transmission of the file; and send the file and the indicator of the file to a second user computing device associated with the second computing network among the plurality of computing networks, wherein the indicator of the file is used at the second computing network to determine the one or more first data handling requirements from a second reference library associated with the second computing network.

15. The non-transitory computer readable medium of claim 14, wherein the determining the first tagged data associated with the file is based on receiving the first tagged data from the first user computing device.

16. The non-transitory computer readable medium of claim 14, wherein the determining the first tagged data associated with the file is based on natural language processing (NLP) of contents of the file.

17. The non-transitory computer readable medium of claim 14, wherein the one or more first data handling requirements correspond to one of:

a requirement that password protection is to be used for the file;

a requirement that at least a portion of the file is to be encrypted for transmission;

a requirement that the file is to transmitted via multiple communication channels; and combinations thereof.

18. The non-transitory computer readable medium of claim 14, wherein the instructions, when executed, cause the first data management platform to:

receive, from a second data management platform, a second file;

determine, based on querying the first reference library, that the first reference library does not comprise a reference library entry corresponding to the second file; and based on determining that the first reference library does not comprise a reference library entry corresponding to the second file, send the file to the first user computing device without any data handling requirements.

* * * * *